March 16, 1937. C. M. C. BAIRD 2,073,824
HOSE COUPLING
Filed Sept. 3, 1936
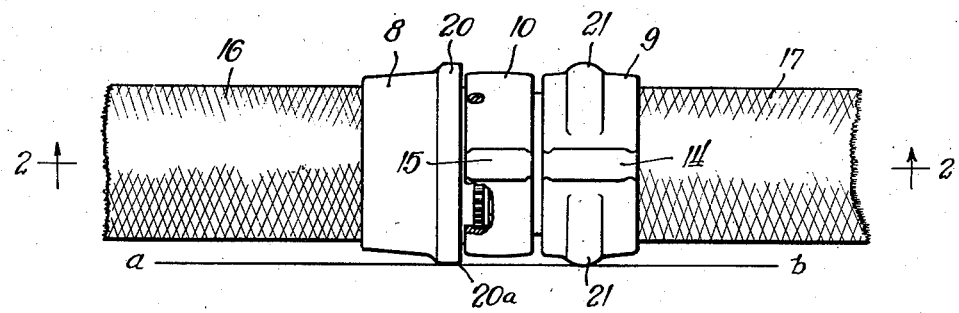
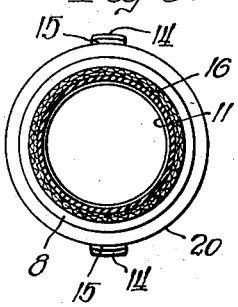
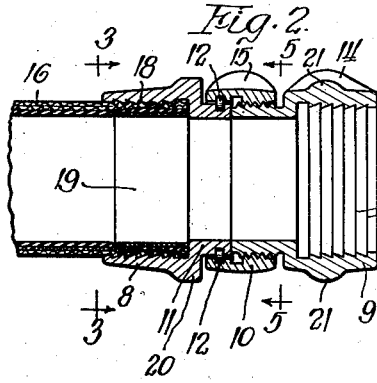
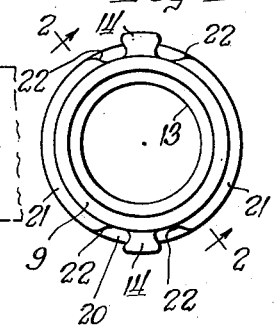
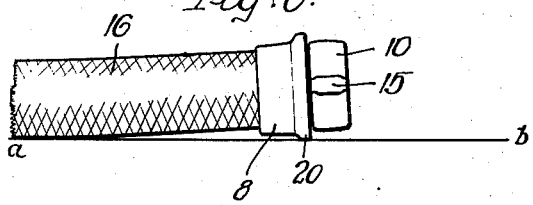
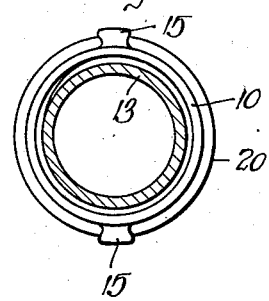
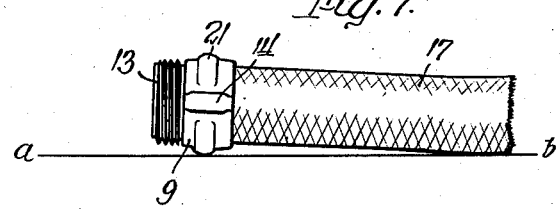
Inventor:
Cassius M. Clay Baird.
By Brown, Jackson, Boettcher & Dienner Patented Mar. 16, 1937

2,073,824

UNITED STATES PATENT OFFICE 2,073,824

HOSE COUPLING

Cassius M. Clay Baird, Evanston, Ill.

Application September 3, 1936, Serial No. 99,190

11 Claims. (Cl. 285—120)

This invention relates to hose couplings, and has to do with a coupling particularly suitable for use in fire hose and for analogous purposes.

In fire hose it is of primary importance that the hose lengths be capable of being coupled together with minimum delay, for obvious reasons. The usual fire hose coupling comprises two end members or tail pieces and an intermediate coupling ring swiveled to one of the end members and having coupling engagement with the other end member. In couplings of ordinary type the outer circumferential surface of the coupling ring is flush with or extends outward beyond the adjacent ends of the coupling end members. Fire hose, including the couplings, is inevitably subjected to rough usage and is frequently dropped upon hard surfaces. The coupling ring frequently is subjected to severe blows and thereby distorted so that it binds and does not turn relative to the associated coupling member. This is highly objectionable in that it renders coupling together of the hose lengths difficult and necessitates reforming the coupling ring, by hammering or otherwise, to restore its original shape.

My invention is directed to the provision of a coupling in which the coupling ring is effectively shielded in such manner as to guard it against severe blows and resulting distortion, assuring that the coupling ring at all times will rotate freely relative to the associated coupling member. A further object of my invention is to provide guard means of the character stated which also serves to reinforce the coupling members while avoiding objectionable projections thereon such as would tend to interfere with ready handling of the hose in use. It is also an object of my invention to provide guard means of the character stated which functions to prevent injury to the threaded portions of the coupling in the event of dropping upon a hard surface of one end of an uncoupled hose length. Further objects and advantages will appear from the detailed description.

In the drawing:—

Figure 1 is an elevational view of a coupling embodying my invention as applied, partly broken away and in section, the hose lengths associated with the coupling members being shown fragmentarily;

Figure 2 is a sectional view taken substantially on line 2—2 of Figure 4, one of the hose lengths being omitted;

Figure 3 is a sectional view taken substantially on line 3—3 of Figure 2;

Figure 4 is an inner end view of one of the coupling members;

Figure 5 is a sectional view taken substantially on line 5—5 of Figure 2;

Figure 6 is an elevational view of the coupling member to which the coupling ring is swiveled, as applied to a hose length, the latter being shown fragmentarily, this view showing how the reinforcing element of the coupling member guards the ring against injury in the event the end of the hose length is dropped upon a relatively hard surface; and Figure 7 is an elevational view of the threaded coupling member attached to a hose length, the latter being shown fragmentarily, showing how the reinforcing elements of the coupling member guard the threaded element thereof against injury in the event of dropping of the end of the hose length upon a relatively hard surface.

The coupling comprises the tail pieces or end members 8 and 9 and the intermediate coupling ring 10. Ring 10 is swiveled to reduced neck 11 of member 8 by means of anti-friction rollers 12 engaging into circumferential grooves formed in the outer face of neck 11 and the inner face of ring 10, in a known manner. Ring 10 is interiorly threaded from its inner end to receive the exteriorly threaded reduced neck 13 extending from the inner end of coupling member 9. The latter member is provided with two lengthwise extending lugs 14 the outer faces of which are rounded, these lugs decreasing in height toward each end. Ring 10 is also provided with two diametrically opposite lugs 15 disposed lengthwise of the ring and having their outer faces of rounded or arcuate shape lengthwise. The lugs 14 and 15 are suitably formed for engagement by a spanner wrench in effecting the coupling and uncoupling operations and, due to their configuration, will not catch on projections and interfere with handling or movement of the hose. These lugs, and the advantages thereof, are disclosed more fully in my Patent No. 1,550,773, issued August 25, 1925, for Hose couplings, and need not be described here nor illustrated, in greater detail.

Hose lengths 16 and 17 extend into the coupling members 8 and 9, respectively, each of which is interiorly provided with circumferential steps or serrations 18. The end portion of the hose length is secured in the coupling member by means of an expansion ring 19, which is expanded in a known manner so as to force the hose into the serrations 18 and secure it therein, thus effectively anchoring the end of the hose length in the coupling member.

Coupling member 8 is tapered, flaring toward its outer end, and is there provided with a reinforcing element 20 in the form of a thickened rib which extends circumferentially about member 8 and is continuous. This element 20 provides a reinforcement for resisting the outward radial pressure to which member 8 is subjected when expansion ring 19 is expanded for securing the end of the hose length. It also provides means for guarding the ring 10, element 20 extending radially outward beyond the outer circumferential surface of ring 10, as shown, in a manner which will be more fully explained presently.

Coupling member 9 is provided, intermediate the lugs 14 thereof, with reinforcing elements 21 in the form of ribs extending circumferentially of member 9 and having their outer surfaces rounded transversely. The ends of the ribs 21 are spaced from the lugs 14, are inclined at 22 and merge into member 9. Lugs 14 are of rugged construction, being of considerable width and of somewhat greater height than ribs or reinforcing elements 21, and the latter and the lugs constitute, in effect, substantially continuous reinforcing means extending about member 9 circumferentially thereof.

The lugs 15 of ring 10 are also of heavy construction and provide substantial reinforcement for this ring, effective to prevent distortion thereof by blows to which lugs 15 are subjected due to dropping of the coupling or other causes incident to use of the hose. The height of lugs 15 is somewhat less than that of lugs 14 and the latter lugs, when the coupling members are secured tightly together, may be disposed so as to be in substantial alinement with or adjacent lugs 15, thus serving to guard the latter to a considerable extent. The height of reinforcing element 20 is less than that of lugs 14 and 15, being about equal to the height of the reinforcing elements or ribs 20. If the couplings be dropped upon a relatively hard surface and the reinforcing elements 20 and 21 strike such surface, the ring 10 will be prevented from striking the surface upon which the coupling is dropped, and is thus guarded against injury or distortion. This will be clear from Figure 1 in which the line a—b represents a hard surface upon which the coupling has been dropped. It will be noted that the elements 20 and 21 support the coupling ring 10 above the surface a—b thus guarding the ring against injury and distortion. In the event the coupling is dropped in such position that a lug 14 or a lug 15 strikes the surface a—b no injury to ring 10 results, since these lugs are of heavy construction and well able to withstand blows which they receive in the use and handling of the hose. In this manner the coupling ring 10 is effectively guarded against injury and distortion when the coupling is dropped or subjected to a blow, in all angular positions of the coupling relative to the axis thereof.

It frequently happens that the end of a hose length is dropped when uncoupled. If the ring 10 were permitted to strike upon a relatively hard surface, upon dropping of the end of the hose length, objectionable distortion of the ring might occur. This is guarded against by the reinforcing element 20 which, striking upon the surface a—b, causes the coupling member 8 to tilt downward toward such surface, since the hose length 16 is flexible, guarding ring 10 against injury, as will be clear from Figure 6.

It is also of importance to protect against injury the threads of neck 13 of coupling member 9. This is effected by the elements 21 and lugs 14, as will be clear from Figure 7. Assume that the hose length 17 has been uncoupled and the end thereof secured in coupling member 9 is dropped upon the relatively hard surface a—b. If one of the elements 21 strikes this surface coupling member 9 tilts downward toward surface a—b so as to raise the neck 13 away from surface a—b, thus preventing injury to the threads on neck 13, as will be clear from Figure 7. In like manner, if either of the lugs 14 strikes the surface a—b, the member 9 will be tilted so as to raise the neck 13 away from surface a—b.

The coupling member 8 is tapered and flares toward its inner end, as stated, the outer circumferential surface of element 20 being flat, thus permitting this member to be cast in a one-piece mold. After member 8 has been removed from the mold the inner edge of element 20 is rounded or beveled at 20a so as to avoid a sharp edge such as might tend to catch on projections in handling of the hose when in use. This, in conjunction with the shape of the lugs 14 and 15 and the transverse rounding of the elements 21, eliminates likelihood of any part of the coupling catching upon projections over which the hose is drawn and thus interfering with the use or handling of the hose, in conformity with the broad teaching of my patent above identified. The coupling member 9 may be cast in a split mold, as may the coupling ring 10. Also, the coupling ring 10 may be swiveled to the coupling member 8 in any suitable or known manner other than that herein disclosed.

While I have illustrated the preferred embodiment of my invention, by way of example, changes in construction and arrangement of parts may be resorted to without departing from the field and scope of my invention, and I intend to include all such variations, as fall within the scope of the appended claims, in this application in which the preferred form only of my invention is disclosed.

What I claim is:—

1. In a coupling, two end members, and a coupling ring swiveled to one of said members and having coupling engagement with the other member, said members being provided with substantially radial projections extending outward beyond said ring and constituting means effective for guarding said ring in all angular positions of the coupling relative to its axis, said ring being between said projections.

2. In a coupling, two end members, and a coupling ring swiveled to one of said members and having coupling engagement with the other member, each of said members being provided with elements constituting substantially continuous radial projections extending outward therefrom beyond the outer circumferential surface of said ring and guarding the latter, said ring being between said projections.

3. In a coupling, two end members, and a coupling ring swiveled to one of said members and having threaded coupling engagement with the other member, each of said members being provided with elements constituting substantially continuous radial projections extending outward therefrom beyond the outer circumferential surface of said ring and guarding the latter, said ring being between said projections.

4. In a coupling, two end members, and a coupling ring swiveled at one end to one of said members and interiorly threaded from its other end, the other coupling member having an exteriorly threaded element at its inner end screwing into said ring, each of said members being provided with means constituting substantially continuous radial projections extending outward therefrom beyond the outer circumferential surface of said ring and guarding the latter, said ring being between said projections.

5. In a coupling, two end members, a coupling ring swiveled to one of said members and having coupling engagement with the other member, hose lengths extending into said members, and expansion rings securing said hose lengths in said coupling members, each of the latter being provided with circumferentially extending reinforcing means constituting substantially continuous radial projections extending outward beyond the outer circumferential surface of said ring and guarding the latter, said ring being between said projections.

6. In a coupling, two end members, and a coupling ring swiveled to one of said members and having coupling engagement with the other member, said ring and said other member being provided with outwardly projecting lengthwise lugs, said other member being provided, intermediate the lugs thereof, with outwardly projecting transversely rounded reinforcing elements extending circumferentially thereof with their ends spaced from said lugs, said one member being provided with a substantially continuous circumferential outwardly projecting reinforcing element rounded at its lateral edges, said reinforcing elements of said members projecting outward beyond the outer circumferential surface of said ring and guarding the latter, said ring being between said reinforcing elements.

7. In a coupling, two end members, and a coupling ring swiveled to one of said members and having coupling engagement with the other member, said ring and said other member being provided with outwardly projecting lengthwise lugs decreasing in height toward each end, said other member being provided intermediate the lugs thereof with circumferential outwardly projecting reinforcing elements having their ends spaced from said lugs, said one member being provided with a substantially continuous circumferential outwardly projecting reinforcing element, said reinforcing elements of said members being of less height than said lugs and projecting outward beyond the outer circumferential surface of said ring and guarding the latter, said ring being between said reinforcing elements.

8. In a coupling, two end members, and a coupling ring swiveled to one of said members and having coupling engagement with the other member, said ring and said other member being provided with outwardly projecting lengthwise lugs decreasing in height toward each end, said other member being provided intermediate the lugs thereof with circumferential outwardly projecting reinforcing elements having their ends merging into said other coupling member and spaced from the lugs thereof, said one member being provided with a substantially continuous circumferential outwardly projecting reinforcing element, said reinforcing elements of said members projecting outward beyond the outer circumferential surface of said ring and guarding the latter, said ring being between said reinforcing elements.

9. In a coupling, two end members, and a coupling ring swiveled to one of said members and having coupling engagement with the other member, said ring and said other member being provided with outwardly projecting lengthwise lugs decreasing in height toward each end, said other member being provided intermediate the lugs thereof with circumferential outwardly projecting reinforcing elements having their ends merging into said other coupling member and spaced from the lugs thereof, said one member being provided with a substantially continuous circumferential outwardly projecting reinforcing element, said reinforcing elements of said members being of less height than said lugs and projecting outward beyond the outer circumferential surface of said ring and guarding the latter, said ring being between said reinforcing elements.

10. A coupling member provided with outwardly projecting lengthwise lugs and circumferential outwardly projecting reinforcing elements between said lugs and terminating adjacent the sides of the latter, said lugs decreasing in height toward each end and being of a maximum height greater than that of said elements.

11. A coupling member provided with outwardly projecting lengthwise lugs and circumferential outwardly projecting reinforcing elements between said lugs and terminating adjacent the sides of the latter with their ends merging into said coupling member, said elements being rounded transversely and said lugs decreasing in height toward each end.

CASSIUS M. CLAY BAIRD.